United States Patent [19]

Hudson

[11] E Re. 29,124

[45] Reissued Jan. 25, 1977

[54] SHEET TRANSPORT SYSTEM

[75] Inventor: Frederick W. Hudson, West Henrietta, N.Y.

[73] Assignee: Xerox Corporation, Stamford, Conn.

[22] Filed: July 3, 1975

[21] Appl. No.: 592,834

Related U.S. Patent Documents

Reissue of:

[64] Patent No.: 3,826,568
Issued: July 30, 1974
Appl. No.: 391,196
Filed: Aug. 24, 1973

[52] U.S. Cl. ..... 355/3 R; 198/624; 198/689; 226/95; 271/197

[51] Int. Cl.[2] ..... G03G 15/00

[58] Field of Search ..... 355/3, 99, 102, 109, 355/111; 198/180, 184, 193; 271/197, 196; 101/232; 226/95

[56] References Cited

UNITED STATES PATENTS

| | | | |
|---|---|---|---|
| 601,883 | 4/1898 | Schwarz | 355/109 |
| 2,969,869 | 1/1961 | Klingler | 198/190 |
| 3,477,558 | 11/1969 | Fleischauer | 198/184 |

*Primary Examiner*—L. T. Hix
*Assistant Examiner*—Kenneth C. Hutchison

[57] ABSTRACT

An endless vacuum belt system for transporting sheets, particularly suited for transporting copy sheets in electrostatographic transfer systems, where the belt is made up of a multiplicity of flexibly connected small diameter hollow tubular, rigid vacuum chambers, each adapted to have a vacuum applied through its end, and where the tubular vacuum chambers extend transverse the belt and have sheet-retaining vacuum openings.

7 Claims, 6 Drawing Figures

FIG. 1
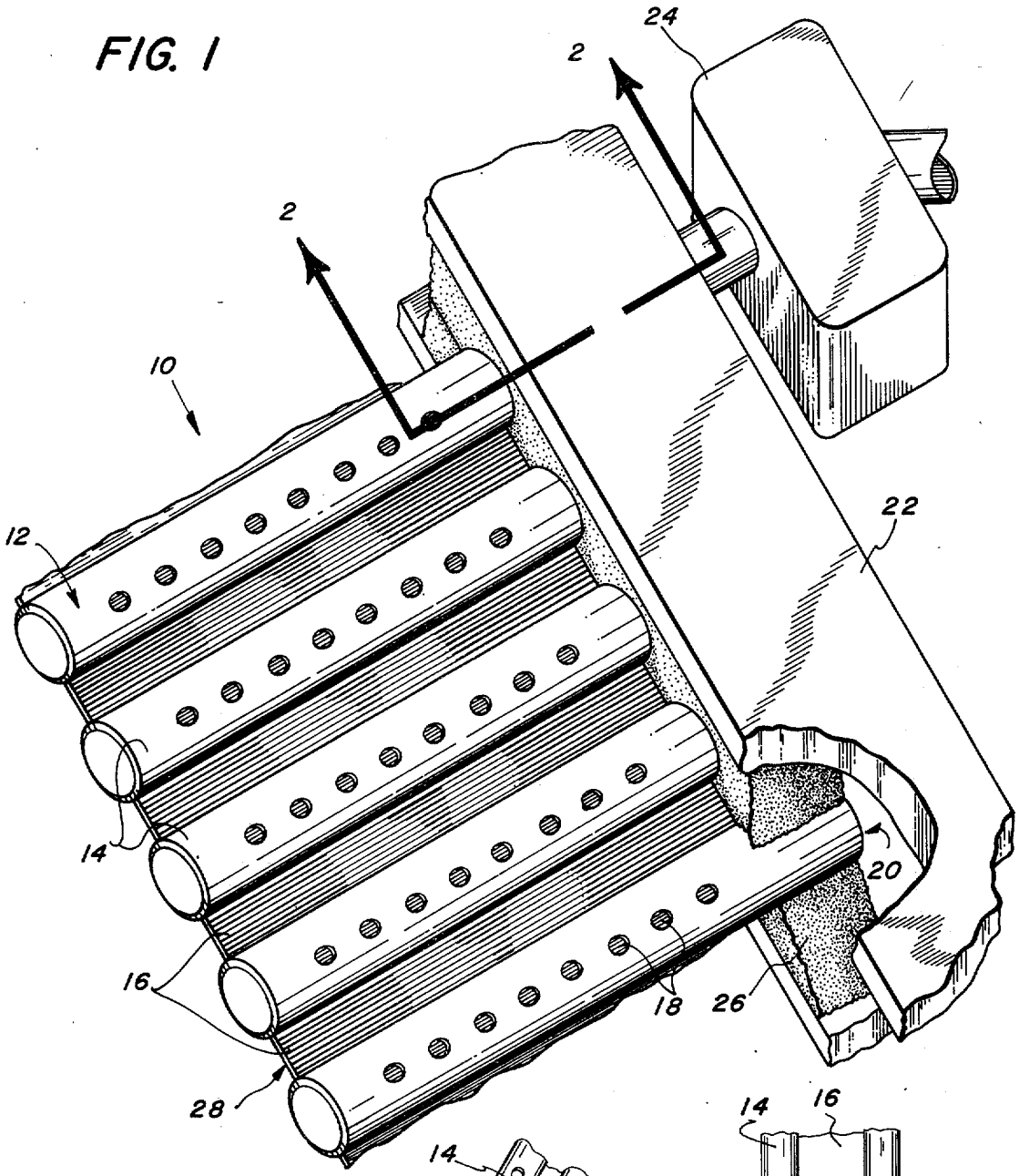
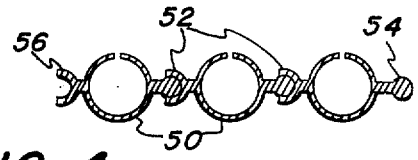
FIG. 4
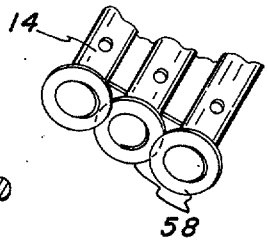
FIG. 5
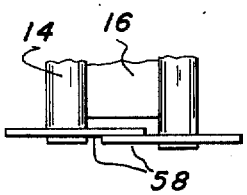
FIG. 6

SHEET TRANSPORT SYSTEM

Matter enclosed in heavy brackets [ ] appears in the original patent but forms no part of this reissue specification; matter printed in italics indicates the additions made by reissue.

The present invention relates to a vacuum belt sheet transport system, including applications to electrostatographic transfer systems. It provides a positive sheet transport belt system particularly well suited for low cost manufacture and a simpler, more compact and light weight structure.

Numerous vacuum sheet transport belts systems may be found in the prior art, including ones utilized in electrostatographic transfer systems. Examples are noted in U.S. Pat. Nos. 3,647,292, issued Mar. 7, 1972 to Donald J. Weikel, Jr. and 3,743,403, issued July 3, 1973, to Frank J. Sanza. Another example of sheet transporting systems in xerography is in U.S. Pat. No. 3,240,486, issued Mar. 15, 1966, to R. F. Reilly. In other transport systems, e.g. a kelp harvester in U.S. Pat. No. 3,311,238, among others, suction roller systems are known with means for applying a vacuum to the end of a fixed roller. Further, it is well known to alternatively of sequentially use vacuum and positive air pressure applications to a sheet to alternatively hold the sheet on a transport belt or repel it therefrom.

An exemplary embodiment of the present invention is shown and described hereinbelow as incorporated in an otherwise conventional exemplary xerographic apparatus and process. Accordingly, said xerographic process and apparatus need not be described in detail herein, since various printed publications and patents and publicly used machines are available which teach details of various suitable exemplary electrophotographic structures, materials and functions to those skilled in the art. Some examples are disclosed in the books Electrophotography by R. M. Schaffert, and Xerography and Related Processes by John H. Dessauer and Harold E. Clark, both first published in 1965 by Focal Press Ltd., London, England; the numerous patents and other references cited in these books, and the patents cited hereinabove. All of these references are hereby incorporated by reference in this specification.

Further objects, features and advantages of the present invention pertain to the particular apparatus and details whereby the above-mentioned aspects of the invention are attained. Accordingly, the invention will be better understood by reference to the following description and to the drawings forming a part thereof, which are generally to scale, wherein:

FIG. 1 is an exemplary embodiment of a belt transport system in accordance with the present invention, in a partial perspective view;

FIG. 4 is an axially cross-sectional view of an alternative embodiment of the vacuum chambers of the embodiments of FIGS. 1 through 3;

FIG. 5 is a perspective view of an alternate embodiment of the vacuum end seals of the system of FIGS. 1 through 3; and FIG. 6 is a top view of the alternate embodiment of FIG. 5.

Figures 2, 3:
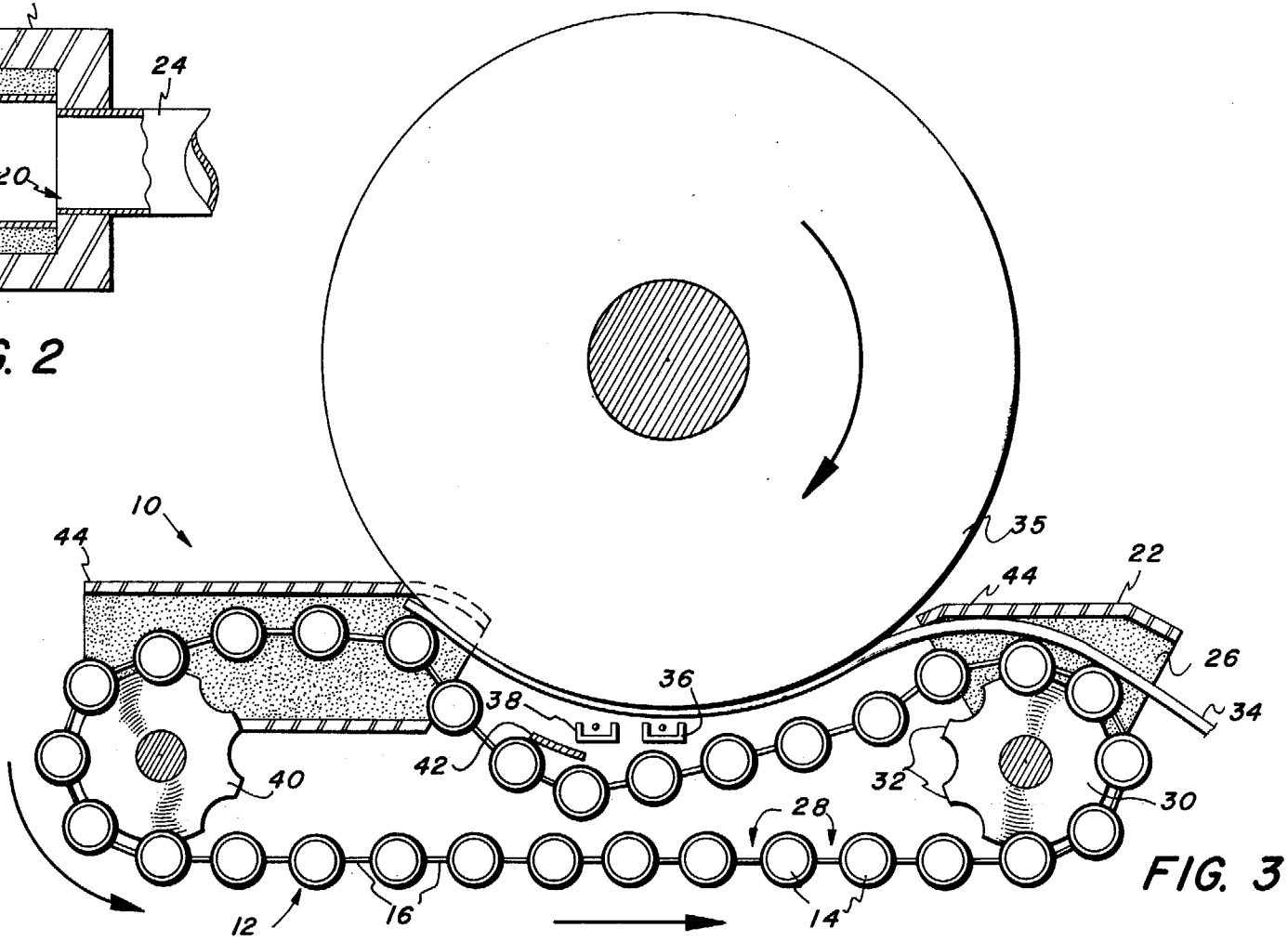
FIG. 2 is a cross-sectional view taken along the line 2—2 of FIG. 1.
FIG. 3 is a side view of the system of FIGS. 1 and 2.

Referring now to the drawings, FIGS. 1–6, and first to the main embodiment of FIGS. 1–3, there is shown therein an endless belt vacuum sheet transport system 10 including a belt 12. The details of the belt 12 are shown particularly in FIGS. 1 and 2, and the overall installation of the system 10 in a conventional xerographic transfer system is illustrated in FIG. 3. Referring first to the novel construction of the belt 12, it may be seen that it comprises a multiplicity of independent elongated tubular vacuum chambers 14. The chambers 14 are uniform hollow cylindrical tubes, preferably of plastic, all extending parallel to one another transversely across the belt 12, i.e., transverse the direction of motion of the belt. The vacuum chambers 14 are flexibly interconnected by connecting webs 16 therebetween. The webs 16 flexibly interconnect the chambers 14 in a series to form the flexible integral belt 12. The chambers 14 themselves are preferably substantially rigid so as to independently transversely support the belt and any sheets being transported thereon.

It may be seen that each of the chambers 14 has extending along its length, i.e., across the belt 12, a multiplicity of sheet retaining vacuum openings 18. A vacuum is individually provided to the interior of selected chambers 14 for communication with its vacuum openings 18 by means of an end opening 20 at at least one end of each chamber 14. Alternatively, positive air pressure may be applied in the same manner. The other end of the chamber 14 may be sealed as shown.

Considering the exemplary disclosed structure for applying a vacuum or positive air pressure to the interior of selected ones of said chambers 14 through their moving ends, i.e., at the edge of the belt, it will be appreciated that the disclosed means are merely exemplary, and that other arrangements may be provided. The structure shown in FIGS. 1 and 2 comprises a fixed vacuum manifold 22 extending along and slidably engaging a selected segment of one edge of the belt 12. The manifold 22 may be provided with a vacuum conventionally through a conventional vacuum system 24 comprising a conventional vacuum pump or blower. The manifold 22 contains a channel or opening communicating with those end openings 20 of the chambers 14 which are in the vacuum manifold 22 at any given time.

To prevent excessive loss of vacuum by the vacuum system 24, flexible seals are preferably provided at the edge of the belt 12. An example is the seal 26 shown in FIGS. 1 and 2. This flexible seal 26 comprises two overlying highly compressible layers of foam rubber material deformably engaging opposite sides (i.e., the top and bottom) of the belt 12 at the belt edge in the manifold 22, to prevent the application of vacuum other than to the end openings 20 of the chambers 14.

The flexibility of this seal 26 accommodates the irregularity of the belt surface dimensions to prevent air leakage, and in particular in the recessed areas of the webs 16 between the chambers 14.

The entire belt 12 is designed to readily monolithically fabricated by extrusion, die-pressing or the like from plastic material. The chambers 14 are preferably uniformly thin walled cylindrical tubes, and the webs 16 therebetween are preferably continuous and integral therewith. This is a desirable feature, so as not to provide any irregular recesses or apertures for the trapping or tearing of the sheets of the paper being transported. The web 16 here comprises a relatively low flexure resistance hinge member extending continuously between the adjacent tubular vacuum chambers 14. This is provided here by a sufficiently thin planar section of the plastic material. The webs 16 are located centrally with respect to the chambers 14 and are very much thinner than the chambers 14 thereby providing regular recesses between the adjacent chambers 14. These regular belt recesses, as may be seen particularly in FIG. 3, can mesh with projecting teeth 32 of conformingly designed sprocket wheels, such as 30, so as to support and driveably engage the belt 12 without slippage. Only one sprocket wheel near each edge of the belt is needed at each sprocket location. The depressions or recesses between the sprocket teeth 32 on the sprocket wheel 30 itself are preferably designed to be semi-cylindrical to smoothly engage the exposed, projecting semi-cylindrical ends of the cylindrical chambers 14.

FIG. 3 shows the full system 10 where the belt 12 is in combination with a conventional xerographic transfer station. An individual sheet 34 of paper must be transported up to, and applied against, a photoreceptor 35 imaging surface at the entrance of the transfer station, in registration with a toner image on the photoreceptor 35. The toner image is then conventionally transferred to the sheet 34 by a conventional transfer corotron 38. The sheet 34 is then preferably also vacuum stripped from the photoreceptor 35 at the exit of the transfer station to insure its removal. It may be seen that the system 10 provides, with only one belt 12 and associated manifolds, all of the structure necessary for both the feeding on of the sheet to the entrance of the transfer station and the vacuum stripping and carrying away of the sheet from the exit of the transfer station, an operation normally utilizing several different and more complicated structures.

The mounting of the belt 12 to achieve the above objective is provided here by spacing the first sprocket wheel 30 upstream of the entrance to the transfer station but closely spaced from the photoreceptor 35. A second sprocket wheel 40 supports the opposite end of the endless belt 12, spaced downstream from the exit of the transfer station. The axes and radii of the sprocket wheels 30 and 40 are such that a direct (linear) upper flight of the belt 12 therebetween would intersect the transfer station. To prevent this, and detour the belt away from the transfer station, a fixed belt guide or deflector 42 is provided to downwardly deflect the central portion of the upper flight of the belt. Obviously, other arrangements such as wheels could be utilized to achieve this function.

By the belt 12 mounting arrangement shown in FIG. 3 a first section of the belt is held closely adjacent the entrance of the transfer station for feeding the sheet 34 carried thereon into the transfer station. Meanwhile, a separate section of the same belt 12 is held closely adjacent the exit of the transfer station for stripping the same sheet 34 from the imaging surface by bringing the vacuum chambers 14 directly up against the backside of the lead edge of the sheet 34 as it emerges from transfer. As previously described, that section of the belt between the first and second sections is held away from the transfer station and imaging surface by the deflector 42.

Any conventional drive means may be utilized for driving one or both of the sprocket wheels 30 and 40. For effective transfer, of course, the sheet carrying speed of the belt should be controlled so as to correspond to the speed of the moving surface of the photoreceptor 35, to thereby prevent image smearing on the sheet 34.

It may be seen that to achieve positive retention of the sheets 34 on the belt 12 that only a portion of the above-described first and second sections of the belt 12 need to be provided with a vacuum manifold. Additional but separate manifolds 44 may also be provided for applying positive air pressure to other short sections of the belt 12 to assist in the removal of the sheet 34 from the belt. The manifolds 44 may be of the same construction, with only the difference that a positive air pressure rather than a vacuum is applied thereto so that the air blows out of the vacuum openings 18 in the chambers 14 to expel the sheet from the belt.

It may be seen from the drawings and the above description that the system 10 provides a flexible paper transport belt having many of the physical advantages of simple non-vacuum paper transport belts, such as the capability of being strung between spaced support pulleys or sprockets. Yet the system 10 also provides positive sheet retention or explusion without requiring large fixed vacuum chambers underlying the belt. With the system 10 any desired segments of any desired size along the path can be maintained at either reduced or increased air pressure to either hold the sheets of paper to the belt or puff it away from the belt. Such a system can provide positive control over paper position and motion through the total paper path, yet it can be a low cost and integrated design. The vacuum or positive air pressure can, as described above, be applied from a small, compact manifold structure at only one edge of the belt, thereby providing minimum interference with the belt function and also making more space available for other equipment, particularly for the space under the belt. The disclosed apparatus allows a single belt to provide a number of different paper transporting functions which would normally require several different individual belts, vacuum shoes or other paper feed units. Conceivably a single belt 12 can be constructed to provide substantially all of the paper transport functions for an entire xerographic apparatus.

Considering now the alternative configuration of FIG. 4, there is shown an axial cross section of three slightly different adjacent vacuum chambers 50, having the same function and operation as described above for the chambers 14 of the belt 12. The only difference here is that the adjacent chambers 50 are connected together by a separable "tongue and groove" hinge 52 rather than by the monolithic web 16 of the belt 12. Each chamber 14 is a separate removable belt link, which is identical and fully interchangeable. The chambers 50 have the same cylindrical hollow tubular configuration, but they also have a tongue projection 54 on one side and a correspondingly extending groove projection 56 on the opposite side. The groove 56 is adapted to partially surround and pivotally lock onto the tongue portion 54 of the next adjacent chamber 50 by means of mating partially cylindrical surfaces, but be relatively transversely slideable to unlock. Any desired number of chambers 50 are slideably linked together by this mating engagement to form a belt of any desired length. Likewise, the belt may be shortened by sliding out to one side one or more individual vacuum chambers 50 and reconnecting the exposed adjacent tongue 54 and groove 56 portions.

Considering now the embodiment of FIGS. 5 and 6, this is an alternative embodiment of the flexible seal 26 of FIGS. 1–3. Instead of utilizing a fixed position flexible seal in the manifolds 22 or 44, a similar solid channeled manifold without the sealing material may be used instead. The seal is here provided by overlapping radially projecting circular flexible flaps 58 extending normally from each chamber 14 at one end thereof. All of the flaps 58 are in substantially the same plane but the flaps 58 of adjacent vacuum chambers slideably overlap and extend above and below the belt sufficiently to cover the vacuum manifold channel and provide the desired air seal.

In connection with either the sealing system of FIGS. 5 and 6 or that of FIGS. 1 and 2, it will be appreciated that low friction materials or low friction skins may be utilized in either flexible sealing arrangement to reduce wear or frictional resistance.

While the embodiments of the present invention disclosed herein are considered to be preferred, it will be appreciated that numerous other modifications and variations may be made by those skilled in the art without departing from the invention. Accordingly, the following claims are intended to cover all such variations and modifications as fall within the true spirit and scope of the invention.

What is claimed is:

[ 1. An endless vacuum belt system for transporting sheets thereon, particularly suited for transporting copy sheets in electrostatographic systems, comprising:

a multiplicity of independent elongated tubular vacuum chambers, each with at least one end opening;

flexible interconnecting means flexibly connecting said tubular vacuum chambers in series to form a flexible integral belt with said tubular vacuum chambers, with said tubular vacuum chambers extending transverse said belt, said tubular vacuum chambers having sheet-retaining vacuum openings extending therealong;

drive means for moving said belt; and vacuum means for applying a vacuum inside selected ones of said tubular vacuum chambers from said end openings thereof.]

[ 2. The vacuum belt system of claim 1, wherein said tubular vacuum chambers are substantially rigid to independently transversely support said belt and any sheets thereon.]

[ 3. The vacuum belt system of claim 1, wherein said vacuum means includes fixed vacuum manifold means and flexible seal means for flexibly sealing a vacuum connection between said manifold means and said tubular vacuum chambers at said end openings thereof.]

[ 4. The vacuum belt system of claim 1, wherein said flexible interconnecting means comprises an elongated low flexure resistance hinge member extending between adjacent tubular vacuum chambers which is substantially thinner than said tubular vacuum chambers and provides recesses between adjacent tubular vacuum chambers.]

[ 5. The vacuum belt system of claim 1, wherein said belt is a monolithic plastic extrusion with said flexible interconnecting means being a continuous thin plastic web.]

[ 6. The vacuum belt system of claim 4, wherein said drive means comprises at least one sprocket wheel engaging said belt with sprocket recesses conforming to said tubular vacuum chambers and sprocket teeth engaging said recesses in said belt.]

[ 7. The vacuum system of claim 6, wherein said belt is as a monolithic plastic extrusion with said flexible interconnecting means being a continuous thin plastic web.]

[ 8. The vacuum system of claim 6, wherein said vacuum means includes fixed vacuum manifold means and flexible seal means for flexibly sealing a vacuum connection between said manifold means and said tubular vacuum chambers at said end openings thereof.]

9. [ The vacuum belt system of claim 1] *An endless vacuum belt system for transporting sheets thereon, particularly suited for transporting copy sheets in electrostatographic systems, comprising:*

*A multiplicity of independent elongated tubular vacuum chambers, each with at least one end opening;*

*flexible interconnecting means flexibily connecting said tubular vacuum chambers in series to form a flexible integral belt with said tubular vacuum chambers, with said tubular vacuum chambers extending transverse said belt,*

*said tubular vacuum chambers having sheet-retaining vacuum openings extending therealong;*

*drive means for moving said belt; and*

*vacuum means for applying a vacuum inside selected ones of said tubular vacuum chambers from said end openings thereof,*

*wherein tubular vacuum chambers are substantially rigid to independently transversely support said belt and any sheets thereon,* in combination with electrostatographic transfer station means in which a sheet is applied against an electrostatographic imaging surface at the entrance to said transfer station, an image is transferred to said sheet, and said sheet is stripped from said imaging surface at the exit of said transfer station.

wherein said drive system for said belt includes first support means for holding a first section of said belt closely adjacent said entrance of said transfer station for feeding sheets thereon into said transfer station, and second support means for holding a second section of said belt closely adjacent said exit of said transfer station for stripping sheets from said imaging surface, and wherein said vacuum means is operatively connected to said first and second sections of said belt.

10. The vacuum belt system of claim 9 further including third support means for holding a third section of said belt between said first and second sections away from said transfer station and said imaging surface.

11. The vacuum belt system of claim 9, wherein said flexible interconnecting means comprises an elongated low flexure resistance hinge member extending between adjacent tubular vacuum chambers, which hinge member is substantially thinner than said tubular vacuum chambers and provides recesses in said belt between said adjacent tubular vacuum chambers.

12. The vacuum system of claim 9, wherein said vacuum means includes fixed vacuum manifold means and flexible seal means for flexibly sealing a vacuum connection between said manifold means and said tubular vacuum chambers at said end openings thereof.

13. The vacuum belt system of claim 9 wherein a fixed vacuum manifold means connects with said belt to apply a vacuum to said vacuum chambers at said first and second sections of said belt, and further including fixed air manifold means for applying positive air pressure to another section of said belt for assisting removal of said sheet for said belt.

14. The vacuum belt system of claim 11, wherein said drive means comprises at least one sprocket wheel engaging said belt with sprocket recesses conforming to said tubular vacuum chambers and sprocket teeth engaging said recesses in said belt.

15. [ The vacuum belt of claim 1 ] *An endless vacuum belt system for transporting sheets thereon, particularly suited for transporting copy sheets in electrostatographic systems, comprising:*

*a multiplicity of independent elongated tubular vacuum chambers, each with at least one end opening;*

*flexible interconnecting means flexibly connecting said tubular vacuum chambers in series to form a flexible integral belt with said tubular vacuum chambers, with said tubular vacuum chambers extending transverse said belt,*

*said tubular vacuum chambers having sheet-retaining vacuum openings extending therealong;*

*drive means for moving said belt; and*

*vacuum means for applying a vacuum inside selected ones of said tubular vacuum chambers from said end openings thereof,*

*wherein said tubular vacuum chambers are substantially rigid to independently transversely support said belt and any sheets thereon,* wherein said tubular vacuum chambers are individually slideably removable from said belt at said flexible interconnecting means to provide an adjustable length belt.

* * * * *